United States Patent [19]
Neitzel et al.

[11] Patent Number: 5,673,681
[45] Date of Patent: Oct. 7, 1997

[54] VENTILATION SYSTEM FOR CONVEYOR OVEN

[75] Inventors: Emery W. Neitzel, Rothschild; Chris B. Check, Wausau; Jay J. Bauman, Schofield, all of Wis.

[73] Assignee: Greenheck Fan Corporation, Schofield, Wis.

[21] Appl. No.: 587,408

[22] Filed: Jan. 17, 1996

[51] Int. Cl.[6] .................................................. F24C 15/20
[52] U.S. Cl. ........................... 126/299 R; 126/299 D; 126/21 A; 99/443 C
[58] Field of Search ..................... 126/299 R, 299 D, 126/21 R, 21 A, 19 R; 34/242; 55/DIG. 36; 99/386, 443 C, 443 R; 454/57, 65

[56] References Cited

U.S. PATENT DOCUMENTS

| | | | |
|---|---|---|---|
| 4,266,529 | 5/1981 | Gaylord | 126/299 D |
| 4,483,316 | 11/1984 | Fritz et al. | 126/299 D |
| 4,643,167 | 2/1987 | Brewer | 126/299 R |
| 5,299,557 | 4/1994 | Braithwaite et al. | 126/299 R |
| 5,421,317 | 6/1995 | Cole et al. | 126/21 A |
| 5,421,320 | 6/1995 | Brown | 126/299 R |

Primary Examiner—James C. Yeung
Attorney, Agent, or Firm—Quarles & Brady

[57] ABSTRACT

A ventilation system for a single or stacked conveyor ovens includes an exhaust canopy which extends across the top of the ovens and defines exhaust channels positioned above the conveyor openings on opposite sides of the ovens. A make-up air system delivers make-up air beneath each conveyor opening where it is directed upward through an air curtain nozzle to produce an air stream that directs cooking gases emanating from the conveyor openings upward and into the exhaust channels.

7 Claims, 3 Drawing Sheets

5,673,681

VENTILATION SYSTEM FOR CONVEYOR OVEN

BACKGROUND OF THE INVENTION

The field of the invention is ventilation systems for ovens, and more particularly, ovens in which the food is cooked by passing it through the oven chamber on a moving conveyor.

Conveyor ovens are commonly used in fast food restaurants because they assure uniform cooking conditions. For example, an uncooked pizza is placed on the conveyor and is carried into the oven chamber where convection currents of heated air are directed over it by powerful fans. The movement of the conveyor is such that the pizza is cooked properly as it is carried from the cooking chamber.

Conveyor ovens produce a great deal of heat and noise, and unlike conventional ovens, they are characterized by entrance and exit openings for the moving conveyor which are always open to the cooking chamber. It is common practice to stack two or more conveyor ovens on top of one another and this multiplies the heat and noise as well as the number of openings into the cooking chamber. Such ovens are described, for example, in U.S. Pat. Nos. 4,244,285; 4,245,613; 4,363,955; 4,377,109; 4,462,383; 4,554,437; 4,576,090; 4,591,333; 4,626,661; 4,701,340; 4,873,107; 4,951,684; 4,965,435; 4,556,043; 4,960,100; 4,964,392; 5,025,775; and 5,231,920.

Early ventilation systems for conveyor ovens were adaptations of ventilation hoods used over conventional cooking equipment. Such systems are disclosed, for example, in U.S. Pat. Nos. 4,321,031; 3,900,533; 4,616,562; 4,716,820; 4,738,243 and 4,896,657. These did not significantly reduce the radiant heat produced by the conveyor ovens, and large amounts of air were exhausted to insure that heated air emanating from the conveyor openings did not escape from the hood.

More recently, ventilation systems specifically adapted for conveyor ovens have been used. These systems are characterized by a double walled enclosure that surrounds much of the oven. This enclosure reduces the surface temperature of the oven, and hence, the heat radiated into the room. It also reduces the noise level.

In one version of such a ventilation system described in U.S. Pat. No. 5,299,557, make-up air within the enclosure flows over the oven and down a front panel. Make-up air also flows into panels on each side of the oven and is blown out through openings located beneath each conveyor. A hood-like exhaust is located above the conveyor openings on each side of the oven and heated air from the cooking chamber is mixed with the make-up air and flows upward into the exhaust. Unfortunately, not all the cooking gases are captured with this arrangement and condensation of grease caused by mixing the cool make-up air at the conveyor openings can be a problem.

In another ventilation system described in U.S. Pat. No. 5,421,317, the above-described difficulties are addressed by a ventilation system in which exhaust openings are placed very close to each conveyor opening, and make-up air flows over the top and down the front and back sides of the oven. By placing the exhaust openings close to the conveyor openings, this structure is said to capture more of the grease-laden cooking gases and exhaust them without grease condensation. Unfortunately, this solution is very expensive to manufacture and the enclosure runs very hot because both sides of the enclosure and portions of the front and top carry hot exhaust gases.

SUMMARY OF THE INVENTION

The present invention is a ventilation system for a conveyor oven or the like in which cool make-up air flows over the entire front and nearly all the side surfaces of the oven and is blown over the conveyor openings in such a manner that cooking gases are captured by an exhaust canopy which overhangs each side of the oven. More specifically, make-up air is supplied through ducts to a lower side panel which is positioned beneath the conveyor opening and which includes an air nozzle extending the width of the conveyor opening through which make-up air is blown upward to provide an air curtain across the conveyor opening which confines cooking gases emanating therefrom and directs them into the overhead exhaust canopy.

A general object of the invention is to exhaust cooking gases from a conveyor oven and minimize the amount of room air exhausted by the system. It has been discovered that cooking gases emanating from conveyor openings can be confined and directed into an overhead exhaust by an upwardly directed make-up air curtain disposed beneath the conveyor opening. The exhaust canopy need not extend from the oven very far to insure capture, but further make-up air may also be directed downward from the exhaust canopy to assist capture, particularly when multiple ovens are stacked.

Another object of the invention is to cool the surfaces of the oven. Because make-up air is introduced adjacent the conveyor openings, the duct work for transporting the cool makeup air covers the entire front of the oven as well as substantially both sides. As a result, the hot exhaust is confined to the overhead exhaust duct and the oven radiates less heat to the surrounding work place.

Yet another aspect of the present invention is to efficiently deal with grease that condenses in the overhead exhaust. The exhaust ductwork is simple in construction and readily accessible for cleaning. The floor of the exhaust plenum is sloped towards the sides of the oven where a grease cup is located. Thus, any grease which condenses in the exhaust will not collect in areas that are difficult to reach.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
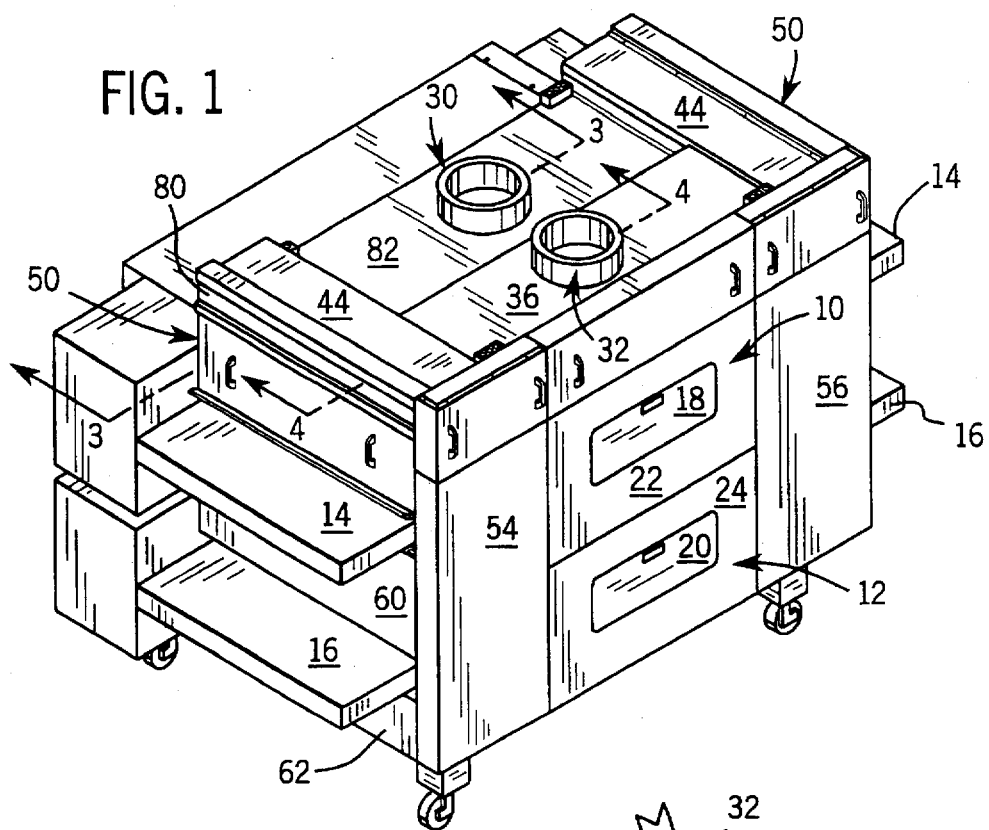
FIG. 1 is a perspective view of the oven and ventilation system which employs the preferred embodiment of the invention.

Referring particularly to FIG. 1, the conveyor oven with integral ventilation system is constructed around two conveyor ovens 10–12 that are stacked one on top of the other. Each oven 10 and 12 has a conveyor 14 and 16 respectively, which extends completely through the oven and extends outward from each side of the oven a distance sufficient to comfortably place food items on the conveyor at the input side and remove food items at the output side. Each oven 10 and 12 has an oven door 18 and 20 respectively, which provides access to the cooking chamber therein through the front oven walls 22 and 24. In the preferred embodiment the conveyor ovens 10 and 12 are model nos. MT3870, MT3855 and MT3270 manufactured by G.S. Blodgett Corporation, however, other ovens may also be used, such as that sold under the trademark "Pacesetter 360" manufactured by Middeby Marshall model nos. PS360, PS360WB, and PS570.

The integral ventilation system virtually encapsulates the ovens 10 and 12 and is comprised of two subsystems: make-up air subsystem; and exhaust air subsystem. The exhaust air subsystem is designed to capture the heated cooking gases produced by the ovens 10 and 12 and exhaust them from the work area through an exhaust duct 30 that extends upward from the top of the oven system. An exhaust fan (not shown) connects to the exhaust duct 30 and draws a preset amount of exhaust air from the work area. In the preferred embodiment the exhaust system draws 1600 ft$^3$ of air per minute. As will be explained in more detail below, the exhaust air subsystem is a relatively simple canopy-type structure which overhangs each side of the ovens to capture cooking gases emanating from the conveyor openings.

The make-up air subsystem serves three basic purposes. First, it brings in unconditioned outside air through a make-up air duct 32 to supplement and significantly reduce the amount of relatively expensive, work area air that is exhausted. In the preferred embodiment a fan (not shown in the drawings) supplies 1200 ft$^3$ per minute of make-up air to the work area, leaving 400 ft$^3$ per minute of conditioned air that is removed from the work area by the exhaust subsystem.

The second basic purpose of the make-up air subsystem is to cool the surface of the ovens 10 and 12. This reduces the heat that is radiated into the work area and makes it more comfortable to work near the ovens 10 and 12. As will be explained in more detail below, the make-up air subsystem in the preferred embodiment encapsulates the front, both sides and most of the top of the ovens 10 and 12 in a blanket of cool make-up air.

The third basic purpose of the make-up air system is to assist in the capture of the heated cooking gases produced by the ovens 10 and 12. As will be described in detail below, the makeup air may be directed into the region of the conveyor openings such that cooking gases are reliably confined and directed into the exhaust system canopy.

Figure 2:
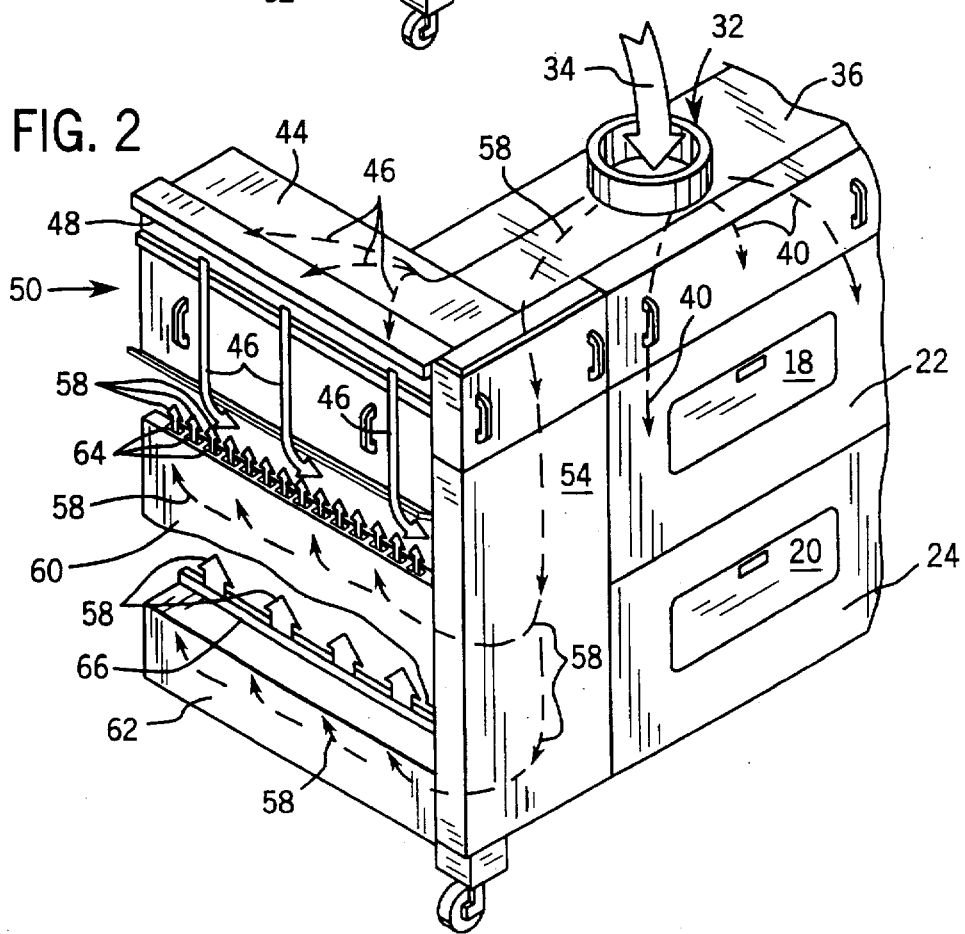
FIG. 2 is a perspective view of the system in FIG. 1 with parts cut away to show the make-up air ductwork that forms part of the ventilation system.

Referring particularly to FIGS. 1 and 2, the make-up air indicated by arrow 34 flows into a make-up air plenum 36 that extends across the top of the ovens adjacent the front. This make-up air plenum 36 communicates with a number of ducts to distribute make-up air over the top, sides and front of the ovens. More specifically, make-up air flows down the front of the ovens through the walls 22 and 24 as indicated by arrows 40. This make-up air enters the work area through openings (not shown) along the bottom edge of front wall 24. This make-up air flows at a rate of approximately 200 ft$^3$ per minute and it is directed rearward, beneath the oven 12.

Figure 4:
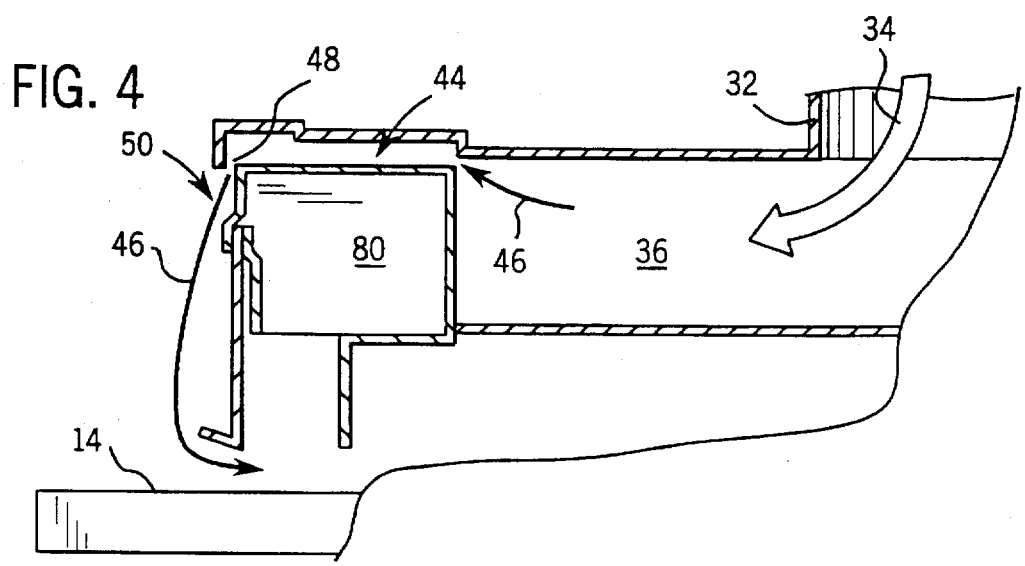
FIG. 4 is a view in cross section taken through the plane 4—4 shown in FIG. 1.

Referring particularly to FIGS. 2 and 4, make-up air also flows from the plenum 36 into horizontal ducts 44 located on top and along each side of the oven system. As indicated by arrows 46, this make-up air flows into the horizontal ducts 44 and is dispersed in a downwardly directed stream through a canopy air opening 48. As will be described in more detail below, the horizontal duct 44 covers the top of an exhaust canopy indicated generally at 50 and the make-up air 46 flows downward toward the top conveyor 14 and wraps around and flows into the exhaust canopy 50. The make-up air 46 is adjusted to confine cooking gases, and in the preferred embodiment it flows at approximately 150 ft$^3$ per minute along each side of the oven. In addition to confining cooking gases, this make-up air helps cool the top of the exhaust canopy 50, significantly reduces the heat radiated into the work area, and minimizes the amount of room air exhausted by the system.

Referring particularly to FIGS. 1 and 2, the make-up air plenum 36 also delivers make-up air to vertical ducts 54 and 56 which define the left and right front corners of the oven system. As indicated by arrows 58, make-up air flows into the top of each vertical duct 54 and 56 from the plenum 36 and downward to a middle side panel 60 and a lower side panel 62. As shown best in FIGS. 2 and 3, the middle side panel 60 on the left side is disposed between the conveyors 14 and 16 and it extends rearward from the vertical duct 54 the entire width of the conveyors 14 and 16. The middle side panel 60 is an air duct for make-up air 58 which is received from the vertical duct 54 and delivered through confinement air openings 64 formed along its top and bottom edges. Similarly, the lower side panel 62 is an air duct for make-up air 58 which is received from the vertical duct 54 and delivered through an air curtain nozzle 66 formed along its top edge. The side panels along the right side of the oven system (not shown) are identical in construction and operation.

Figure 3:
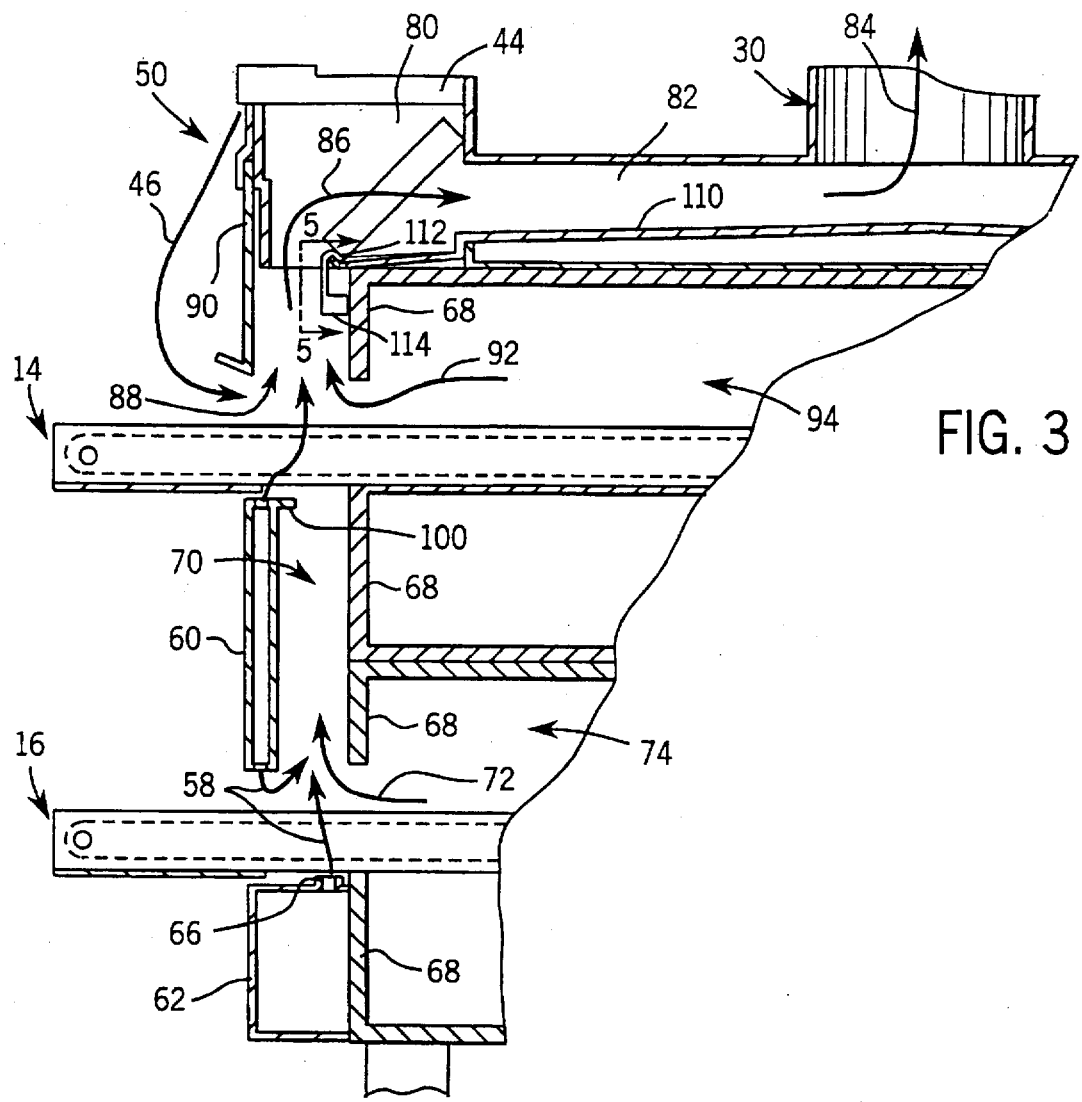
FIG. 3 is a view in cross section taken through the plane 3—3 shown in FIG. 1 to show the exhaust ductwork.

As shown best in FIG. 3, the middle side panel 60 is spaced away from the oven side walls 68 to form a chimney 70 therebetween. Make-up air 58 from the lower side panel 62 is directed upward through the lower conveyor 16 into this chimney 70, and it forms an air curtain which "turns" cooking gases produced in the lower oven's cooking chamber 74 upward, and into the chimney 70 as indicated by arrow 72. The velocity and volume of the make-up air 58 in this air curtain is adjusted to turn the cooking gases 72 upward into the chimney 70 without causing cooking gases to escape from the exhaust canopy 50. In the preferred embodiment a make-up air flow through the air curtain nozzle 66 of approximately 250 ft$^3$ per minute is employed on each side of the oven system. Less make-up air is needed in the middle side panel 60, and in the preferred embodiment, approximately 100 ft$^3$ per minute is supplied on each side to help confine the cooking gases within the chimney 70.

It should be apparent from the above description that the make-up air system is designed to provide cooling air over the oven surfaces exposed to the work area and to inject most of this air into the region around the conveyor openings on each side. The make-up air is, therefore, not only used to reduce the exhaust of conditioned air, but also to cool the exterior of the ovens and to actively confine the cooking gases within the "reach" of the exhaust canopy 50.

Referring particularly to FIGS. 1 and 3, the exhaust canopy 50 includes exhaust ducts 80 that are formed on the top of the oven 10 and are positioned along each side, above the conveyor 14. The exhaust ducts 80 are joined by an exhaust plenum 82, which extends across the top of the oven 10 and behind the make-up air plenum 36. The exhaust duct 30 extends upward from the center of the exhaust plenum 82 and connects to an exhaust fan as described above.

Referring particularly to FIG. 3, the exhaust air indicated by arrows 84 is drawn from each exhaust duct 80 as indicated by arrow 86. A wide opening is formed along the bottom of each exhaust duct 80 and this opening defines the upper end of a channel 88 formed by a canopy side panel 90 and the oven side wall 68. This channel 88 is disposed directly above the chimney 70 to draw in the make-up air 58 and cooking gases 72 therein. It also draws in the make-up air 46 streaming down and around the canopy side panel 90, as well as the cooking gases indicated by arrow 92 from the upper oven cooking chamber 94. In the preferred embodiment approximately 800 ft$^3$ per minute of air is exhausted on each side of the exhaust canopy 50 with the result that some conditioned air from the work area is also drawn into each channel 88.

While the amount of make-up air and its distribution by the various outlets near the conveyor openings are the primary variables that are adjusted to insure that the exhaust canopy 50 captures all the cooking gases, fine tuning may be required. As shown in FIG. 3, in the preferred embodiment this is achieved by adjusting the size of a flange 100 that extends horizontally from the top edge of the middle side panel 60 toward the oven side wall 68. This flange 100 effectively adjusts the size of the chimney 70 and is set at a point in which all the cooking gases 72 from the lower oven 12 are successfully turned up into the chimney 70. If the flange 100 is too small, however, the effective chimney size is too big and cooking gases will spill out from under the exhaust canopy 50.

Figure 5:
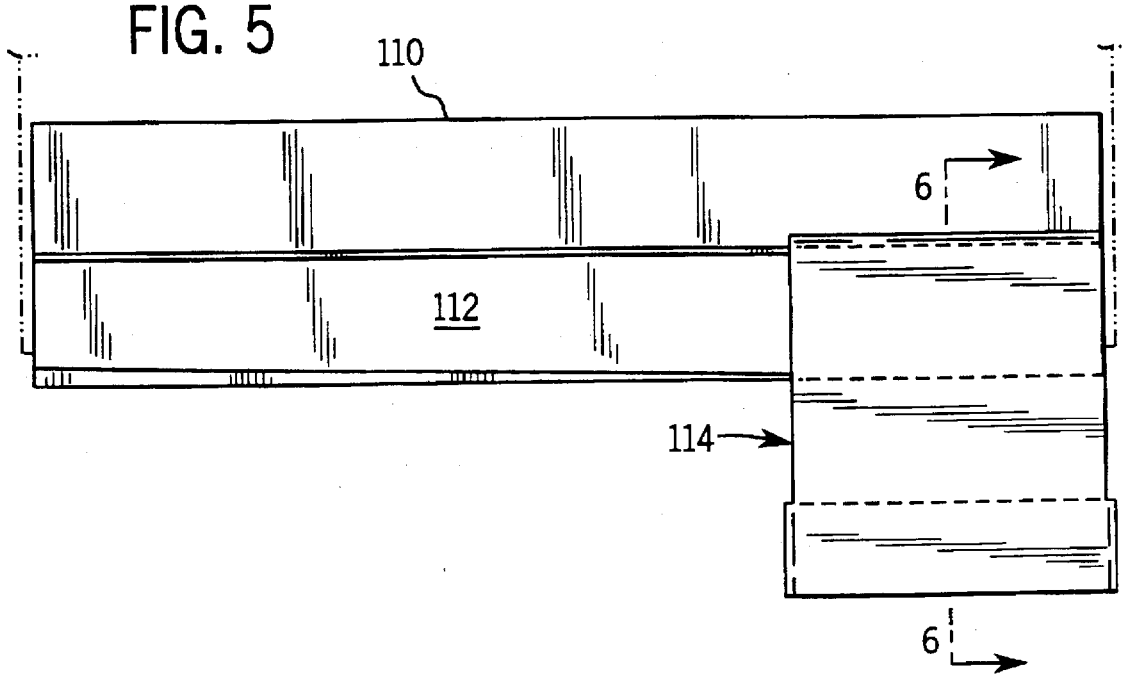
FIG. 5 is a partial view of the exhaust ductwork showing a grease collection assembly.
Figure 6:
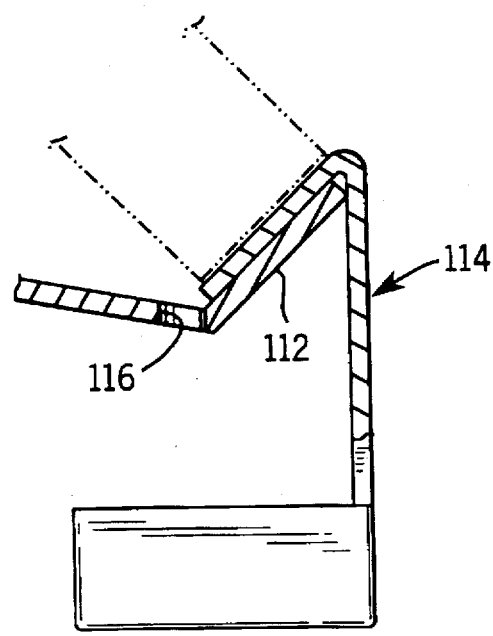
FIG. 6 is a partial view of the grease collection assembly of FIG. 5 showing a grease cup.

Cooking gases are typically laden with grease which condenses against cooler surfaces. Since the cool make-up air is mixed with the cooking gases at the conveyor openings, grease will condense on the inside surfaces of the exhaust plenum 82 and exhaust duct 30. To facilitate cleaning of the ventilation system the exhaust plenum floor 110 is sloped as shown in FIG. 3 such that condensed grease will flow outward toward the exhaust duct 80. A trough 112 is formed along the outer edge of the sloped floor 110, and as shown in FIG. 5, this trough 112 slopes downward toward the front of the oven system. A grease cup 114 attaches at the forward end of the trough 112 and collects the grease flowing into the trough 112 and through a drain hole 116 formed at its forward end. The canopy side panel 90 is removable to provide access to the grease cup 114 for regular emptying and to provide access to the exhaust duct 80 and exhaust plenum 82 for periodic cleaning.

We claim:

1. A ventilation system for a conveyor oven having a conveyor opening in one of its sides, the combination comprising:

an exhaust canopy disposed on top of the oven and extending outward from the side of the oven to form an exhaust channel above the conveyor opening;

make-up air means for providing make-up air and conveying make-up air to a location beneath the conveyor opening; and an air curtain nozzle connected to the make-up air means and disposed beneath the conveyor opening to direct a stream of make-up air upward along the side of the oven such that cooking gases flowing out of the conveyor opening are directed upward and into the exhaust channel.

2. A ventilation system for a conveyor oven having a conveyor opening in one of its sides, the combination comprising:

an exhaust canopy disposed on top of the oven and extending outward from the side of the oven to form an exhaust channel above the conveyor opening;

make-up air means for providing make-up air and conveying make-up air to a location beneath the conveyor opening;

an air curtain nozzle connected to the make-up air means and disposed beneath the conveyor opening to direct a stream of make-up air upward along the side of the oven such that cooking gases flowing out of the conveyor opening are directed upward and into the exhaust channel; and a panel is mounted to the side of the oven above the conveyor opening and is spaced from the side of the oven to form a chimney which guides make-up air and cooking gases upward along the side of the oven.

3. The ventilation system as recited in claim 2 in which the oven has a second conveyor opening in said side disposed above said chimney and beneath the exhaust channel.

4. The ventilation system as recited in claim 2 which includes means for adjusting the size of the chimney.

5. The ventilation system as recited in claim 2 in which the make-up air means supplies make-up air to the interior of the panel and confinement openings are formed along a top edge of the panel to direct make-up air upward therefrom.

6. The ventilation system as recited in claim 1 in which the make-up air means conveys make-up air to a location above the exhaust canopy and a canopy air opening directs make-up air downward along an outward side of the exhaust canopy to the exhaust channel.

7. A ventilation system for a conveyor oven having conveyor openings in both of its sides, the combination comprising:

an exhaust canopy disposed on top of the oven and extending outward from both sides of the oven to form exhaust channels above the conveyor openings, on both sides, the exhaust canopy including;

a) an exhaust plenum which connects the exhaust channels to an exhaust duct that extends upward therefrom at a location between the sides of the oven, and the exhaust plenum having a floor which is sloped to carry condensed grease toward the exhaust channels, and b) grease collection means formed in each exhaust channel and positioned to collect grease flowing on said plenum floor; and make-up air means for providing make-up air and conveying make-up air to a location adjacent the conveyor opening where it flows into the air space around the oven.

* * * * *